(12) United States Patent
Sun et al.

(10) Patent No.: US 11,143,265 B2
(45) Date of Patent: Oct. 12, 2021

(54) SMA-STF BASED VISCOUS DAMPER

(71) Applicants: Li Sun, Shandong (CN); Chunwei Zhang, Shandong (CN)

(72) Inventors: Li Sun, Shandong (CN); Chunwei Zhang, Shandong (CN); Heming Zhang, Shandong (CN); Chunyang Zhu, Shandong (CN); Yinru Lv, Shandong (CN); Chuang Li, Shandong (CN)

(73) Assignees: Li Sun, Qiangdao (CN); Chunwei Zhang, Qingdao (CN)

( * ) Notice: Subject to any disclaimer, the term of this patent is extended or adjusted under 35 U.S.C. 154(b) by 0 days.

(21) Appl. No.: 16/992,249

(22) Filed: Aug. 13, 2020

(65) Prior Publication Data
US 2020/0370617 A1 Nov. 26, 2020

Related U.S. Application Data

(63) Continuation of application No. PCT/CN2019/093762, filed on Jun. 28, 2019.

(30) Foreign Application Priority Data

Nov. 21, 2018 (JP) .......................... 201811390707.2

(51) Int. Cl.
F16F 9/20 (2006.01)
F16F 13/00 (2006.01)
E04H 9/02 (2006.01)

(52) U.S. Cl.
CPC ......... *F16F 13/005* (2013.01); *E04H 9/0237* (2020.05); *F16F 13/00* (2013.01);
(Continued)

(58) Field of Classification Search
CPC ........ F16F 13/00; F16F 13/005; F16F 13/007; F16F 9/20; F16F 2224/0258; F16F 2230/0023; E04H 9/0237
(Continued)

(56) References Cited

U.S. PATENT DOCUMENTS 5,967,268 A * 10/1999 de Molina ................ F16F 9/52
188/266.5
6,454,206 B2 * 9/2002 Vincent ..................... F16F 9/20
188/266.3
(Continued)

FOREIGN PATENT DOCUMENTS

CN 2921137 Y 7/2007
CN 101509534 A 8/2009
(Continued)

*Primary Examiner* — Thomas W Irvin

(57) ABSTRACT

An SMA-STF based viscous damper includes a first connector, a piston rod, a piston which is sheathed on the piston rod; a damping cylinder; first and second end covers which are respectively provided at two sides of the damping cylinder; a second connector which is fixedly connected to the second end cover; and first and second SMA springs which are respectively sheathed on the piston rod. The damping cylinder has first and second damping cavities between which the piston is arranged. One end of the piston rod passes through the first end cover and is connected to the first connector, and the other end passes through the second connector. The first and second SMA springs are respectively held in the first and second damping cavities in an elastic state. The first and second damping cavities are respectively filled with the STF.

7 Claims, 1 Drawing Sheet

(52) U.S. Cl.
CPC ............... *F16F 2224/0258* (2013.01); *F16F 2230/0023* (2013.01)

(58) Field of Classification Search
USPC ........................................ 188/312
See application file for complete search history.

(56) References Cited

U.S. PATENT DOCUMENTS

| | | | | |
|---|---|---|---|---|
| 6,676,074 | B2* | 1/2004 | Zoppitelli | B64C 27/35 |
| | | | | 244/17.11 |
| 7,314,124 | B2* | 1/2008 | Martyn | F16F 5/00 |
| | | | | 188/312 |
| 7,607,522 | B2* | 10/2009 | Nygren | B25B 13/48 |
| | | | | 188/319.1 |
| 8,261,892 | B2* | 9/2012 | Browne | F16F 9/466 |
| | | | | 188/266.7 |
| 8,393,446 | B2* | 3/2013 | Haugen | F16F 9/42 |
| | | | | 188/266.7 |
| 9,897,159 | B2* | 2/2018 | Marble | F16F 9/3485 |
| 2002/0095879 | A1 | 7/2002 | Fanucci | |
| 2013/0032442 | A1* | 2/2013 | Tuluie | F16F 9/20 |
| | | | | 188/378 |
| 2015/0152933 | A1* | 6/2015 | Yeh | F16F 9/19 |
| | | | | 188/317 |

FOREIGN PATENT DOCUMENTS

| | | |
|---|---|---|
| CN | 101942868 A | 1/2011 |
| CN | 105317914 A | 2/2016 |
| CN | 106641084 A | 5/2017 |
| CN | 107152486 A | 9/2017 |
| CN | 108458032 A | 8/2018 |
| JP | 6044636 A | 3/1985 |

\* cited by examiner

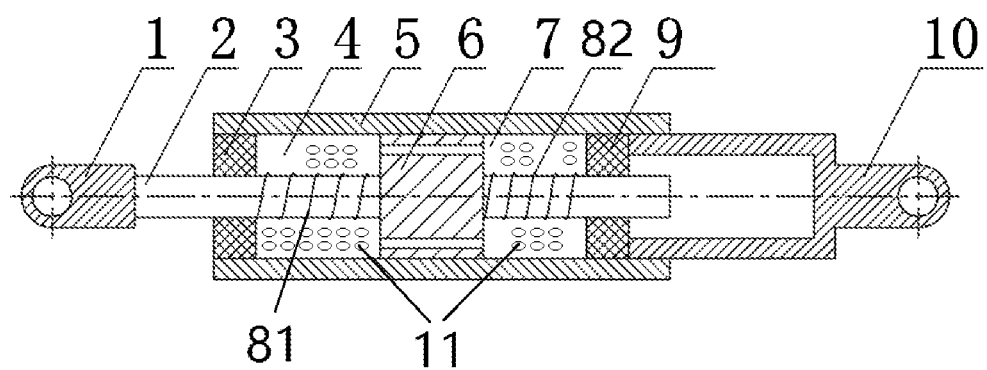

SMA-STF BASED VISCOUS DAMPER

CROSS-REFERENCE TO RELATED APPLICATIONS

This application is a continuation of International Application No. PCT/CN2019/093762, filed on Jun. 28, 2019, which claims the benefit of priority from Chinese Patent Application No. 201811390707.2, filed on Nov. 21, 2018. The content of the aforementioned applications, including any intervening amendments thereto, is incorporated herein by reference.

TECHNICAL FIELD

This application relates to shock absorption and shock resistance, and more particularly to a shape memory alloy (SMA)-shear thickening fluid (STF) based viscous damper.

BACKGROUND OF THE DISCLOSURE

As an extremely destructive natural hazard, earthquakes cause inestimable losses in a short time, which greatly threatens the survival and development of humans. The earthquake frequently happens and always results in casualties, collapses and destructions of structures such as houses and infrastructures, in which the destruction of buildings is the immediate cause of casualties and economic losses during the earthquake. Therefore, it is fundamental to improve the earthquake-resistance performance of buildings to reduce the losses caused by earthquakes. However, traditional aseismic methods fail to achieve a good damping effect. Therefore, it is important to create novel design concepts and methods for the earthquake resistance.

In 1972, Prof. Zhiping Yao from Purdue University has introduced the structural control theory into civil engineering. Compared with conventional aseismic designs, the structural control allows the structures to adjust and control itself, so that the stiffness, the damping and the quality of the structures can be adjusted within a certain range according to the strength, frequency and time of duration, which greatly reduces the dynamic response of the structure, and thus meets the basic requirements for safety and comfort of the structure. The structural control mainly includes the active control, semi-active control, shock insulation, energy dissipation and intelligent control. Currently, there are relatively mature investigations and applications of the energy dissipation.

The energy dissipation system is formed by designing some non-loadbearing elements as energy dissipation elements, or adding energy dissipation devices at some positions of the structure. During the earthquake, these energy dissipation elements and devices will turn into a plastic state first for energy dissipation of the structure. According to different energy dissipation mechanisms, the energy dissipation devices are divided into viscous dampers, metal dampers, friction dampers, viscoelastic dampers and electrical (magnetic) induction dampers.

The viscous damper is nonstiff and related to velocity, which is mainly used in large-scale and tall buildings, such as houses, industrial buildings and bridges to dissipate destructive energy brought by earthquakes. Since the damping force of the general viscous damper is determined by velocity, it can provide no or little damping effect to structural distortion caused by the static load with a low velocity. When the structural distortion is beyond the designed displacement range, the structure will be broken.

SUMMARY OF THE DISCLOSURE

An object of the disclosure is to provide an SMA-STF based viscous damper, which is capable of providing a damping force under low frequencies and self resetting to overcome the defects in the prior art. The SMA-STF based viscous damper has a good energy dissipation and seismic mitigation, a resetting function, a simple structure and an easy assembly. In addition, a limit function is realized when the static deformation is beyond a designed stroke.

The disclosure adopts the following technical solutions.

The disclosure provides an SMA-STF based viscous damper, comprising:
a first connector;
a piston rod;
a piston which is sheathed on the piston rod;
a damping cylinder;
a first end cover and a second end cover which are respectively provided at two ends of the damping cylinder;
a piston which is sheathed on the piston rod;
a first SMA spring and a second SMA spring which are respectively sheathed on the piston rod; and
a second connector which is fixedly connected to the second end cover;
wherein the damping cylinder has the first damping cavity and the second damping cavity between which the piston is arranged; one end of the piston rod passes through the first end cover and is connected to the first connector, and the other end of the piston rod passes through the second connector; the first SMA spring and the second SMA spring are respectively held in the first damping cavity and the second damping cavity in an elastic state; and the first damping cavity and the second damping cavity are respectively filled with the STF.

The disclosure has the following beneficial effects.

Under a low-frequency load, the damping force of the SMA-STF based viscous damper is mainly provided by the first SMA spring and the second SMA spring. Under medium-frequency and high-frequency loads, the damping force of the SMA-STF based viscous damper is provided by the first SMA spring, the second SMA spring and the STF at the same time. This not only meets general working requirements, but also overcomes the defect of insufficient damping force of general viscous dampers under the low-frequency load, which facilitates the energy dissipation of buildings. In addition, the SMA spring has a limit function. Specifically, when a static deformation of the SMA-STF based viscous damper exceeds the stroke, the SMA spring is compressed for space limiting. The SMA-STF based viscous damper is capable of self setting and returning to the initial state after the load is removed. The first SMA spring and the second SMA spring are respectively sheathed on two ends of the piston rod, which ensures damping forces from the first SMA spring and the second SMA spring can be applied for the pulling and pushing of the piston rod. The SMA-STF based viscous damper obtains a good energy dissipation and seismic mitigation, and a resetting function through the first SMA spring, the second SMA spring and the STF.

BRIEF DESCRIPTION OF THE DRAWINGS

FIGURE is a schematic diagram of an SMA-STF based viscous damper according to an embodiment of the present disclosure.

DETAILED DESCRIPTION OF EMBODIMENTS

The disclosure will be described in detail with reference to the accompanying drawings and embodiments.

As shown in FIG. 1, the disclosure provides an SMA-STF based viscous damper, including: a first connector 1; a piston rod 2; a damping cylinder 5; a first end cover 3 and a second end cover 9 which are respectively provided at two ends of the damping cylinder 5; a first damping cavity 4; a piston 6 which is sheathed on the piston rod 2; a second damping cavity 7; a first SMA spring 81 and a second SMA spring 82 which are sheathed on the piston rod; and a second connector 10 which is fixedly connected to the second end cover 9.

The SMA-STF based viscous damper adopts a dual-rod mode. The damping cylinder 5 has the first damping cavity 4 and the second damping cavity 7 between which the piston 6 is arranged. One end of the piston rod 2 passes through the first end cover 3 and is connected to the first connector 1, and the other end of the piston rod 2 passes through the second end cover 9. The first SMA spring 81 and the second SMA spring 82 are respectively held in the first damping cavity 4 and the second damping cavity 7 in an elastic state. The first damping cavity 4 and the second damping cavity 7 are respectively filled with a shear thickening fluid (STF) 11.

The first SMA spring 81 and the second SMA spring 82 are deformable in an axis of the piston rod 2. When one of the first SMA spring 81 and the second SMA spring 82 is elongated, the other is retracted.

When the piston 6 moves towards the second damping cavity 7, the second SMA spring 82 on the piston rod 2 is compressed, and the first SMA spring 81 correspondingly returns.

An elongation of one of the first SMA spring 81 and the second SMA spring 82 is equal to a retraction of the other of the first SMA spring 81 and the second SMA spring 82.

When the SMA-STF based viscous damper is subjected to compression force and has a static deformation larger than the stroke, the second SMA spring 82 is compressed, and the first SMA spring 81 returns to an original length until the first SMA spring stops working.

When the external load is removed, the second SMA spring 82 which is compressed returns to push the piston 6 to move towards the first damping cavity 4, and the first SMA spring 81 is compressed to work.

A seal ring is provided between the piston rod 2 and the first end cover 3, and a seal ring is provided between the piston rod 2 and the second end cover 9.

When the SMA-STF based viscous damper is subjected to a pulling force, the first connector 1 drives the piston rod 2 and the piston 6 to move towards the first connector 1, and the first SMA spring 81 in the first damping cavity 4 is retracted, and the second SMA spring 82 in the second damping cavity is elongated. When the pulling force is slowly applied, the damping force of SMA-STF based viscous damper is mainly provided by the first SMA spring 81 and the second SMA spring 82, while the STF is subjected to a small damping force at the orifices of the piston 6. When the pulling force has a certain velocity, the damping force of the SMA-STF based viscous damper is provided by the first SMA spring 81, the second SMA spring 82 and the STF at the same time.

When the SMA-STF based viscous damper is subjected to a compression force, the second SMA spring 82 in the second damping cavity is retracted, and the first SMA spring 81 in the first damping cavity is extended. Similarly, when the compression force is slowly applied, the damping force of the SMA-STF based viscous damper is mainly provided by the first SMA spring 81 and the second SMA spring 82. When the compression force has a certain velocity, the damping force of the SMA-STF based viscous damper is provided by the first SMA spring 81, the second SMA spring 82 and the STF at the same time.

After the external load disappears, the first SMA spring 81 and the second SMA spring 82 provide an elastic restoring force to push the piston 6 to reset the SMA-STF based viscous damper. Meanwhile, the piston 6 pushes the STF 11 to flow through an orifice. Therefore, the SMA-STF based viscous damper of this disclosure dissipates the energy through the internal friction of the STF 11 when flowing through the orifice, the retraction of the first SMA spring 81 and the extension of the second SMA spring 82, thereby achieving the energy dissipation for the structure.

The resistances of the first SMA spring 81 and the second SMA spring 82 are irrelated to the loading velocity, and only related to the deformation position of the structure. In order to control the deformation to be within the designed range, the parameters of the first SMA spring 81 and the second SMA spring 82 can be selected according to the relation of the load and the deformation.

The SMA-STF based viscous damper of the present disclosure improves the dynamic response of the structure, is capable of self resetting, and is easy to be mounted and operated. In addition, a certain limit resistance is achieved when the structure has an excessive displacement.

What is claimed is:

1. An SMA-STF based viscous damper, comprising:
    a first connector;
    a piston rod;
    a damping cylinder;
    a first end cover and a second end cover which are respectively provided at two ends of the damping cylinder;
    a piston which is sheathed on the piston rod;
    a first shape memory alloy (SMA) spring and a second SMA spring which are respectively sheathed on the piston rod; and
    a second connector which is fixedly connected to the second end cover;
    wherein the damping cylinder has a first damping cavity and a second damping cavity between which the piston is arranged; one end of the piston rod passes through the first end cover and is connected to the first connector, and the other end of the piston rod passes through the second connector; the first SMA spring and the second SMA spring are respectively held in the first damping cavity and the second damping cavity in an elastic state; and the first damping cavity and the second damping cavity are respectively filled with an shear thickening fluid (STF).

2. The SMA-STF based viscous damper of claim 1, wherein the first SMA spring and the second SMA spring are deformable in an axis of the piston rod; and when one of the first SMA spring and the second SMA spring is elongated, the other is retracted.

3. The SMA-STF based viscous damper of claim 2, wherein when the piston moves towards the second damping cavity, the second SMA spring on the piston rod is compressed, and the first SMA spring correspondingly returns.

4. The SMA-STF based viscous damper of claim 2, wherein an elongation of one of the first SMA spring and the second SMA spring is equal to a retraction of the other of the first SMA spring and the second SMA spring.

5. The SMA-STF based viscous damper of claim 2, wherein when an external load is applied onto the SMA-STF based viscous damper and a static deformation of the SMA-STF based viscous damper exceeds a stroke, the second SMA spring is compressed, and the first SMA spring correspondingly returns until the first SMA spring stops working.

6. The SMA-STF based viscous damper of claim 5, wherein when the external load is removed, the compressed second SMA spring returns to push the piston to move towards the first damping cavity, and the first SMA spring is compressed to work.

7. The SMA-STF based viscous damper of claim 1, wherein a seal ring is provided between the piston rod and the first end cover, and a seal ring is provided between the piston rod and the second end cover.

* * * * *